United States Patent [19]
Bertina et al.

[11] Patent Number: 6,091,817
[45] Date of Patent: *Jul. 18, 2000

[54] HOST AND USER TRANSACTION SYSTEM

[75] Inventors: Johannes Marinus George Bertina, Canning Vale; Quentin Rees Oliver, South Perth, both of Australia

[73] Assignee: Intellect Australia Pty Ltd.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/957,722

[22] Filed: Oct. 24, 1997

Related U.S. Application Data

[63] Continuation of application No. 08/424,258, filed as application No. PCT/AU93/00552, Oct. 26, 1993, Pat. No. 5,682,027.

[30] Foreign Application Priority Data

Oct. 26, 1992 [AU] Australia ................................ PL5520

[51] Int. Cl.$^7$ ....................................................... H04L 9/00
[52] U.S. Cl. ................................................................ 380/9
[58] Field of Search ........................... 380/9, 23; 235/380

[56] References Cited

U.S. PATENT DOCUMENTS

| | | |
|---|---|---|
| 3,971,916 | 7/1976 | Moreno . |
| 4,007,355 | 2/1977 | Moreno . |

(List continued on next page.)

FOREIGN PATENT DOCUMENTS

| | | |
|---|---|---|
| 573872 | 6/1988 | Australia . |
| 427456 | 5/1991 | European Pat. Off. . |
| 486363 | 5/1992 | European Pat. Off. . |

(List continued on next page.)

OTHER PUBLICATIONS

Datapro Handheld Password Generators: An Overview Information Services Group, Mar. 1993, McGraw Hill NB: Published Mar. 1993 (9 pages).

Toshiba System Catalogue of Semi–Conductors for IC Cards (9 pages) author, month, year missing.

(List continued on next page.)

*Primary Examiner*—Salvatore Cangialosi
*Attorney, Agent, or Firm*—Ladas & Parry

[57] ABSTRACT

A host and user transaction system comprising a self contained portable intelligent device (13) for use by a service user, and an interface device (11) for use by a service provider. The intelligent device (13) is in the form of an integrated circuit (IC) card incorporating a single chip microcomputer having an input/output communication port (15), nonvolatile memory (17, 19) and random access memory (21). The interface device (11) has its own memory for storing data and a coupler (14) to connect to the IC card for communicating therewith. The nonvolatile memory (17, 19) has in one part an operating system mask programmed in native code for performing basic functions and in a second part data files with different access restriction levels. The random access memory (21) is available for use by the operating system and stores data received from or ready for transmission via the communication port (15). The interface device (11) includes a program module within its own memory, which includes instructions for working with prescribed data files within the second part of the nonvolatile memory (17, 19). These instructions are performed by the operating system after the IC card is connected to the coupler by means of a program interpreter and form part of a prescribed instruction set discrete from the native code. Basic functions performed by the operating system in native code are only performed in accordance with a command executor which is limited to enabling the IC card to receive commands, perform prescribed functions in respect of the command and provide a result or status to the command, but not to execute program modules for performing a transaction which involves data file access.

40 Claims, 9 Drawing Sheets

U.S. PATENT DOCUMENTS

| | | |
|---|---|---|
| 4,277,837 | 7/1981 | Stuckert . |
| 4,341,951 | 7/1982 | Benton . |
| 4,453,074 | 6/1984 | Weinstein . |
| 4,634,845 | 1/1987 | Hale et al. . |
| 4,831,242 | 5/1989 | Englehardt et al. . |
| 4,879,645 | 11/1989 | Tamada et al. .......................... 380/23 |
| 4,882,474 | 11/1989 | Anderl et al. . |
| 4,885,788 | 12/1989 | Takaragi et al. ......................... 380/23 |
| 4,910,774 | 3/1990 | Barakat et al. .......................... 380/23 |
| 4,926,480 | 5/1990 | Chaum . |
| 5,120,939 | 6/1992 | Claus et al. . |
| 5,200,600 | 4/1993 | Shinawawa . |
| 5,212,373 | 5/1993 | Fujioka et al. . |
| 5,225,664 | 7/1993 | Iijima . |
| 5,227,612 | 7/1993 | Le Roux . |
| 5,231,569 | 7/1993 | Myatt et al. . |
| 5,252,812 | 10/1993 | Nakamura . |
| 5,286,962 | 2/1994 | Fujioka et al. . |
| 5,351,296 | 9/1994 | Sullivan . |
| 5,379,344 | 1/1995 | Larsson et al. . |
| 5,682,027 | 10/1997 | Bertina et al. .......................... 235/380 |

FOREIGN PATENT DOCUMENTS

| | | |
|---|---|---|
| 490455 | 6/1992 | European Pat. Off. . |
| 2667171 | 3/1992 | France . |
| A2667171 | 3/1992 | France . |
| 2680261 | 2/1993 | France . |
| 1504196 | 3/1978 | United Kingdom . |
| 1505715 | 3/1978 | United Kingdom . |
| 2250361 | 6/1992 | United Kingdom . |
| 9015382 | 12/1990 | WIPO . |
| 9117524 | 11/1991 | WIPO . |
| 9206451 | 4/1992 | WIPO . |

OTHER PUBLICATIONS

International Standard ISO 7816–1:1987 (E) Identification cards–integrated circuits(s) cards with contacts: Part 1: Physical characteristics; Part 2: Dimensions and location of contacts; Part 3: Electronic signals and transmission protocols, author, month, year for each parts 1,2,3, are missing.

"TRS–80 Model 1," *Carlson Internet Website*, Internet Document, Jun. 1999.

"TRS–80 Model I," *Mike's Personal Computer Museum*, Internet Website, Jun. 1999.

"TRS–80 Model I, Level II BASIC," *Mike's Personal Computer Museum*, Internet Website, Jun. 1999.

"Apple II," *The Machine Room*, Internet Website, Jun. 1999.

HOST AND USER TRANSACTION SYSTEM

This is a continuation of application Ser. No. 08/424,258 filed Jun. 20, 1995, now U.S. Pat. No. 5,682,027 which is a U.S. National Stage of PCT/AU93/00552, filed Oct. 26, 1993.

This invention relates to a host and user transaction system and has particular, although not exclusive, utility in performing commercial transactions involving a plurality of service providers and a plurality of service users.

In this specification, the term "transaction" is defined to mean any type of interchange involving data or information, which may or may not be specific to the performance of a commercial transaction. In addition, the terms "service provider" and "service user" are similarly not limited to the provision and use of services of only a commercial nature and relate to the identity of any two entities involved in an interchange of any nature, for which the invention may have utility.

The invention is based on the use of a self-contained portable intelligent device which includes a microprocessor for performing data processing. Such devices are presently being embodied in the form of integrated circuit cards (IC cards). These cards in their basic form have the appearance of a standard credit card but incorporate within them various forms of integrated circuits to allow for on-board storage and processing of data via an input-output port.

The development of these IC cards to date has been limited, whereby these cards function more as a means of storing data as opposed to running "application" programs as such. Thus, these cards act under the control of an external device, being physical half duplex devices which basically receive commands and respond to requests.

IC cards are basically divided into synchronous and asynchronous type cards. Synchronous cards are essentially a serial memory device which do not have commands as such. Most do not have read/write control attributes, and only some have access control. Hardware driver routines are needed to do the bit by bit accessing of these types of IC cards.

Asynchronous cards are more sophisticated, in the main comprising a single chip microcomputer which is entirely self-contained on the card. The microcomputer comprises a central processing unit, volatile and nonvolatile memory, and an IO port. The main program of the microcomputer is generally specific to partitioning, storing and retrieving data in the nonvolatile memory, usually with some kind of reed/write control attributes that are optional and reasonably flexible. The main program comprises an operating system which is provided with a command executor that acts on commands to create files, to read and write to files and handle passwords. Hence most of these cards have security features that control access to the card and/or specific data areas, and which allow for changing of passwords.

An important consideration with respect to the use of these portable self-contained intelligent devices is the ability to secure data storage within these devices as well as the ability to secure the transmission of this data to and from these devices.

Secure data storage can be achieved by two basic methods. One is to store the data in an encrypted form in the memory of the portable intelligent device, and the other is to store the data as clear data in the device but to introduce security measures to restrict the access of this data, such as password type access restriction mechanisms.

The first method implies the need for a security module that contains cipher keys which are kept secret by the security features of the security module employed for both the portable device and the host system to which the service provider is connected. Accordingly, data for storage would be encrypted by the security module using a specific cipher key (eg, the one related to the memory area that the data is to be stored in) and then passed over for storage.

The second method requires that the data be stored inside a secure module, whereby access to the module is restricted. A single chip microcomputer with no external buses, as used in asynchronous IC cards makes a good secure module and consequently IC cards of this type are particularly suited to the present invention.

These types of IC cards are operated by programs consisting of native code for the microcomputer stored in the mask ROM thereof. Such a program executes at power on after reset and controls all accesses to the data storage area of the microcomputer. The program handles the serial communications and recognises and acts on a number of high level command frames from the serial communications. These command frames are for creating storage areas, opening a storage area for reading or writing, presenting a password for a storage area unlocking a card after too many wrong passwords, possibly encryption. In handling only specific commands in very specific ways, the card can provide secure data storage.

Present techniques for securing data transmission rely upon the use of secret cipher keys to encrypt the data. These keys have to be stored securely and used securely, otherwise the data transmission is not secure.

With the increased sophistication of these types of portable self-contained intelligent devices, and the expanded use of computer technology to provide for remote user and host transactions via point of sale devices, automatic teller machines and the like, which already exist for performing financial transactions, there is a tremendous opportunity for the entire commercial and information transaction interface to change further in both the interests of the service provider and service user.

Although IC cards with single chip microcomputers provide a tremendous opportunity for enabling transactions to occur between service users and service providers, there is still a reluctance to utilise these cards to their full capacity for the purposes of conducting transactions particularly where confidential or sensitive data and information are required to be stored upon the card, due to the lack of standardisation in the command set of these cards, lack of security in presenting a password, and lack of flexibility in the use of these cards.

It is an object of the present invention, to provide a system for enabling a service user to perform a plurality of transactions with different service providers whilst providing a high level of security for the performance of the transactions both with respect to the service provider and the service user.

It is a preferred object of the present invention to provide a system for the secure interchange of data and information between a service provider and service user to facilitate transactions between the two which may involve the interchange of commercial data and/or information with a high level of security.

It is a further preferred object of the present invention to provide a portable self-contained intelligent device which is able to form a secure module for the storage of data and information communicated thereto from a service provider.

In accordance with one aspect of the present invention, there is provided a system for performing a plurality of transactions comprising:

(i) a self-contained portable intelligent device including a microcomputer having an input/output communication port, nonvolatile memory, and random access memory; and (ii) an interface device associated with a memory for storing data and a coupler to connect to said intelligent device for establishing communications therewith;

said nonvolatile memory being arranged such that one part thereof has an operating system mask programmed in native code for said microcomputer for performing basic functions, and a second part thereof is adapted to store data files having different access restriction levels thereto;

said random access memory being provided for use by said operating system when performing a function and for storing data received from or ready for transmission via said communication port; and said interface device including a program module within said memory comprising one or more instructions for working with prescribed data files within said second part of said nonvolatile memory in accordance with said operating system after said intelligent device is connected to said coupler;

wherein said operating system includes: (a) a command executor for receiving a command, performing a prescribed function in respect of said command, and providing a result or status to the command; and (b) a program interpreter for executing said program module to perform a transaction; and a system for performing a transaction comprising:

(i) a self-contained portable intelligent device including a single chip microcomputer having an input/output communication port, nonvolatile memory, and random access memory; and (ii) an interface device associated with a memory for storing data and a coupler to connect to said intelligent device for establishing communications therewith;

said nonvolatile memory being arranged such that one part thereof has an operating system mask programmed in native code for said microcomputer for performing basic functions, and a second part thereof is adapted to store data files having different access restriction levels thereto;

said random access memory being provided for use by said operating system when performing a function and for storing data received from or ready for transmission via said communication port; and said interface device including a program module within said memory comprising one or more instructions for working with prescribed data files within said second part of said nonvolatile memory in accordance with said operating system after said intelligent device is connected to said coupler;

wherein said operating system includes: (a) a command executor for receiving a command, performing a prescribed function in respect of said command, and providing a result or status to the command, and (b) a program interpreter for executing said program module to perform a transaction; and wherein said one or more instructions form part of a prescribed instruction set discrete from said native code and have restricted control functions to limit data file access.

Preferably, said program module is loaded into said random access memory via said communication port by said command executor a system as claimed in claim 1, wherein said program module is loaded into said random access memory via said communication port by said command executor in response to a prescribed command received and executed thereby when said intelligent device is connected to said coupler for subsequent execution by said program interpreter.

When said intelligent device is connected to said coupler for subsequent execution by said program interpreter.

Alternatively, said program module may be loaded into a third part of said nonvolatile memory via said system as claimed in claim 1, wherein said program module is loaded into a third part of said nonvolatile memory via said communication port by said command executor in response to a prescribed command received and executed thereby when said intelligent device is connected to said coupler for execution by said program interpreter.

Preferably, said program module is encrypted and said operating system includes a data encryption and decryption program to decrypt said program module in accordance with a prescribed algorithm.

Preferably, said intelligent device includes a keyboard and display.

Preferably, said algorithm is the Data Encryption Standard algorithm (D.E.S.) or RSA algorithm.

Preferably, a plurality of said program modules are loaded sequentially into said random access memory and chained together to extend the capability of the system.

Preferably, said program modules are encrypted and said operating system includes a data encryption and decryption program to decrypt said program modules in block chaining mode in accordance with a prescribed algorithm.

Preferably, said algorithm is the Data Encryption Standard algorithm (D.E.S.) or the RSA algorithm (RSA).

Preferably, said data files each comprise records whereby different records within a file can have different access restriction levels thereto.

Preferably, a said program module is adapted to allow a data representation method suited to the specific application thereof to be used.

In accordance with another aspect of the invention, there is provided a self-contained portable intelligent device for performing a transaction with an interface device associated with a memory for storing data and a coupler for connecting to said intelligent device for establishing communications therewith, comprising:

a single chip microcomputer having an input/output communication port, nonvolatile memory, and random access memory; wherein;

(i) said nonvolatile memory is arranged such that one part thereof has an operating system mask programmed in native code for said microcomputer for performing basic functions, and a second part thereof is adapted to store data files having different access restriction levels thereto;

(ii) said random access memory is provided for use by said operating system when performing a function and for storing data received from or ready for transmission via said communication port;

(iii) said operating system includes: (a) a command executor for receiving a command, performing a prescribed function in respect of said command, and providing a result or status to the command; and (b) a program interpreter for executing a program module transmitted thereto for performing a transaction;

(iv) said program module comprises one or more instructions for working with prescribed data files within said second part of said nonvolatile memory in accordance with said operating system; and (v) said one or more instructions form part of a prescribed instruction set discrete from said native code and having restricted control functions to limit data file access.

In accordance with a further aspect of the invention, there is provided a method for performing a transaction between an intelligent device as claimed in any one of claims and the interface device referred to therein, comprising:

creating a program module comprising one or more instructions for working with prescribed data files within the intelligent device;

storing said program module in the memory of the interface device;

coupling the intelligent device to the interface device; and invoking a program interpreter forming part of the operator system of the intelligent device to interpret and execute said instructions of said program module;

wherein said one or more instructions form part of a prescribed instruction set discrete from the native code for the microcomputer of the intelligent device, and have restricted control functions to limit data file access.

The invention will be better understood in the light of the following description of one specific embodiment thereof. The description is made with reference to the accompanying drawings, wherein.

The embodiment is directed towards a host and user transaction system. The host comprises a plurality of service providers which provide services for a plurality of users, who are able to independently establish and perform some form of transaction with certain service providers, as is deemed mutually appropriate.

In order to establish and perform transactions, each of the service providers is equipped with an interface device 11 associated with a central host processing device, and each of the service users are equipped with a self-contained portable intelligent device 13.

The interface device 11 of the service provider is associated with a memory (not shown) for storing data and is provided with a coupler 14 which is adapted to connect to an intelligent device 13 of a service user for establishing communications therewith. The interface device 11 may comprise a terminal, communication device or machine to which the intelligent device can be electrically connected during operation thereof, and which can be remote from or local to the host processing device.

In the present embodiment, the interface device 11 is a point of sale (POS) terminal having a card accepter device (not shown) incorporating the coupler 14 in order to establish communications with the intelligent device 13.

The POS terminal is connected via a conventional communication line to the host processing device, and includes some limited processing capacity by means of a microprocessor and memory to enable communications between the host processing device and the intelligent device, as well as communications between itself and the intelligent device, separate from the host processing device.

The host processing device comprises a computer system which includes a prescribed cryptographic processing system adapted for use with a multiplicity of keys, including a secret key stored therewith which is adapted to match a secret key stored within a particular intelligent device.

Figure 1:
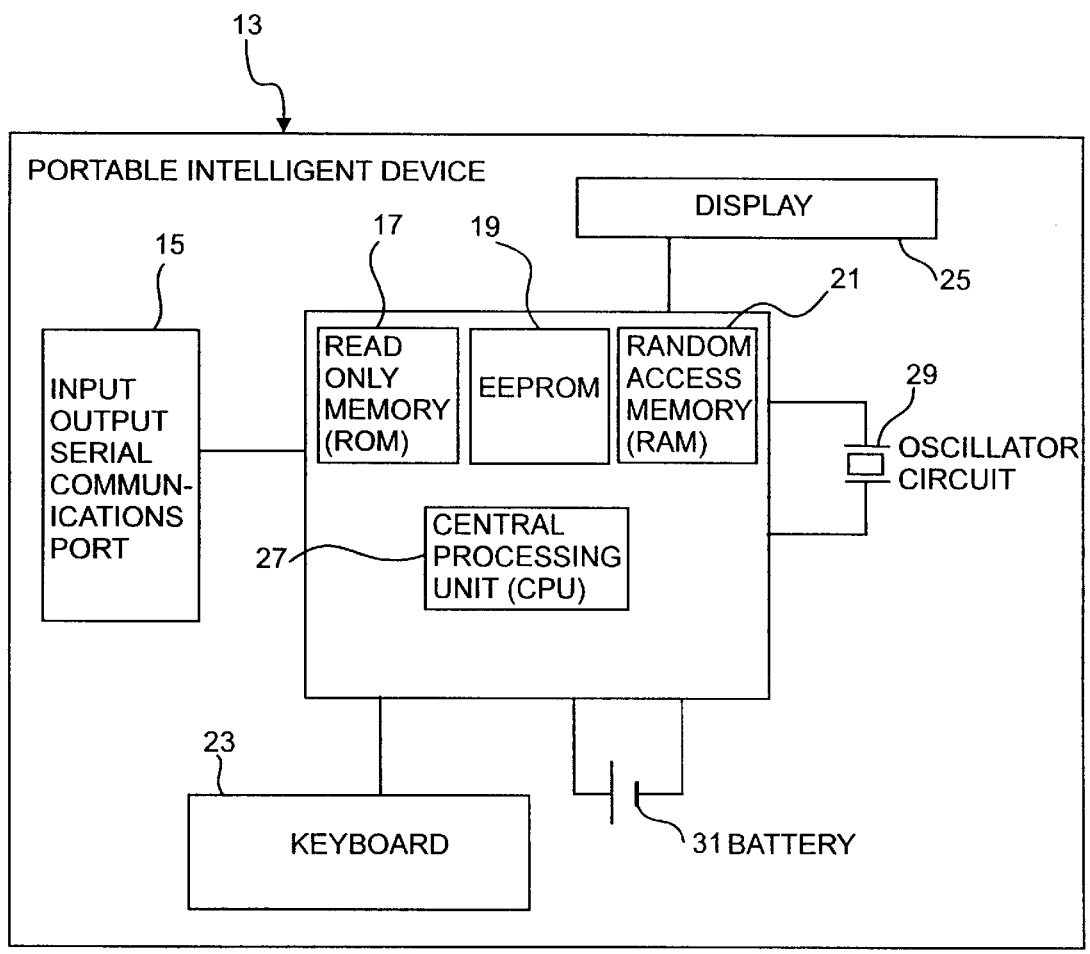
FIG. 1 is a block diagram of the intelligent device.

The intelligent device 13 as shown in FIG. 1 of the drawings, includes a microcomputer having an input/output serial communication port 15, nonvolatile memory in the form of mask read only memory (ROM) 17 and electrically erasable programmable read only memory (EEPROM) 19, random access memory (RAM) 21, keyboard 23, display 25, central processing unit (CPU) 27, oscillator circuit 29 and power supply in the form of a battery 31, all embedded within an identification card to form what is more commonly known as a visual integrated circuit (IC) card.

Importantly, the intelligent device 13 is self-powered and so can be used without the need of other electronic equipment. However, the intelligent device 13 is not so limited and the provision of the input/output serial communication port 15 enables it to be electrically connected to the coupler 14 to allow communication with the interface device 11.

The microcomputer is embodied in a single monolithic integrated circuit, housing both the CPU 27 and all of the volatile and nonvolatile memory of the microcomputer. The microcomputer is arranged so that it can only operate in a single chip mode from a operating system program which is masked into the ROM 17 of the integrated circuit at the time of manufacture. This operating system program, known as the "mask" program, provides the basis for the operation of the intelligent device and invokes a number of discrete special routines which are also masked into the ROM to form an overall "mask" program which provides a high level of security.

The operating system of the "mask" program has the usual standard routines that perform functions such as detecting key presses at the keyboard 23, writing data to the display 25, communicating with external system via the serial communication port 15, memory allocation and encryption. The special routines, however, specifically relate to the present invention and will be described in more detail later.

The keyboard 23 comprises a series of numeric keys, 0 through to 9, and a series of function keys identified as New Line (NL), Enter (E), Clear (*) and Menu (M), the purpose of which will be described in more detail later.

The display 25 is a sixteen character liquid crystal display of conventional type.

The microcomputer integrated circuit is of a type especially adapted for visual IC cards incorporating a cryptographic processing system.

The battery 31 is a lithium battery and the oscillator circuit 29 is a standard quartz oscillator both suitable for the microcomputer IC.

Figure 2:
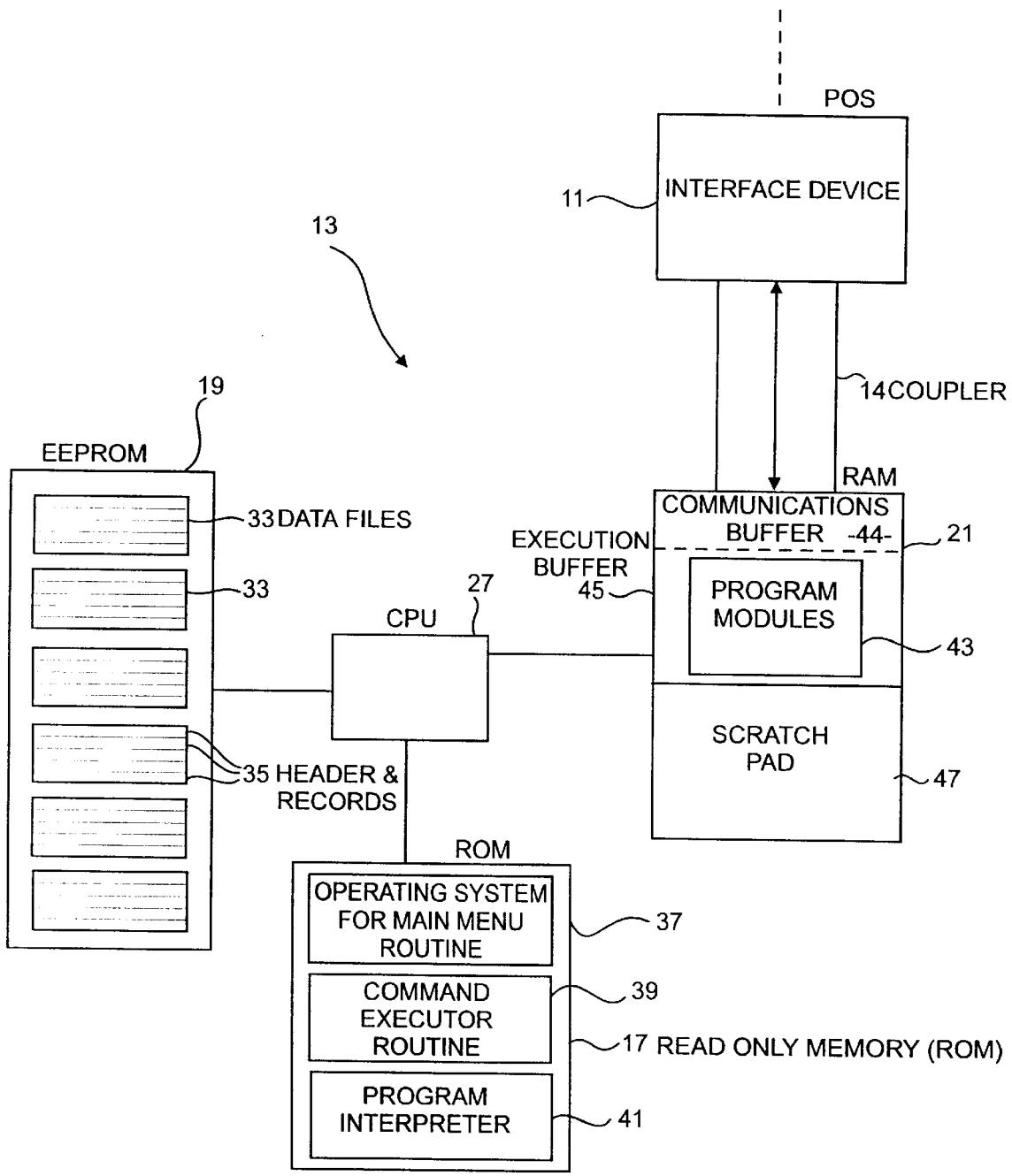
FIG. 2 is a schematic showing the manner in which the intelligent device is used in conjunction with a host to perform a transaction.

The EEPROM 19 of the nonvolatile memory is adapted to store a plurality of data files 33, as shown demonstratively in FIG. 2 of the drawings. Data files are basically partitions in the nonvolatile memory which are used for data storage. These files can be created having different access restrictions, such as: read/write/read only/write only/no access/password access. The data files 33 each comprise a header and one or more records 35. The header contains information that identifies the file, the start address of the file, the next free address after the end of the file (which becomes the header of a new file), the record size and number, its access attributes and its password number.

In the present embodiment, there are sixteen passwords that can be used, where passwords can be up to eight characters in length. If less than eight characters, a byte with zero value is used to terminate the password entry.

The partitions in the nonvolatile memory in which the files are stored are created when the header information is written, whereby the address of the start of the file and the next free address are observed by the operating system.

Where a data file 33 comprises a plurality of records 35, the records themselves are additionally defined by way of record headers to provide for different access restrictions, so that different records inside a data file can have different access restrictions without the entire file requiring the same access condition. For example, a password may be required to read one particular record of a file and the rest of the file may require a personal identification number (PIN) plus the password in order to be read.

In this manner, the number of files requiring storage within the available memory space of the EEPROM 19 can be reduced, saving on memory space, as each data file must include header information at the start of the file which takes up space, in addition to the records thereof. Furthermore, increased flexibility and simplicity is provided by having the data files 33 differentiated predominantly by function and not mandatorily by access restriction.

The special routines of the mask program of the ROM 17 include a main menu routine, a command executor, and a program interpreter. As shown demonstratively in FIG. 2, the ROM 17 is depicted showing the mask program divided into three functional blocks. The first 37 is the operating system and main menu routine which are closely interrelated, the second 39 is the command executor routine, and the third is the program interpreter 41.

The main menu routine is concerned with built-in functions which are selected by entering the menu mode and scrolling through the memory by successive presses of the M key. Each menu item is displayed in turn and can be selected by the E key.

Figure 3:
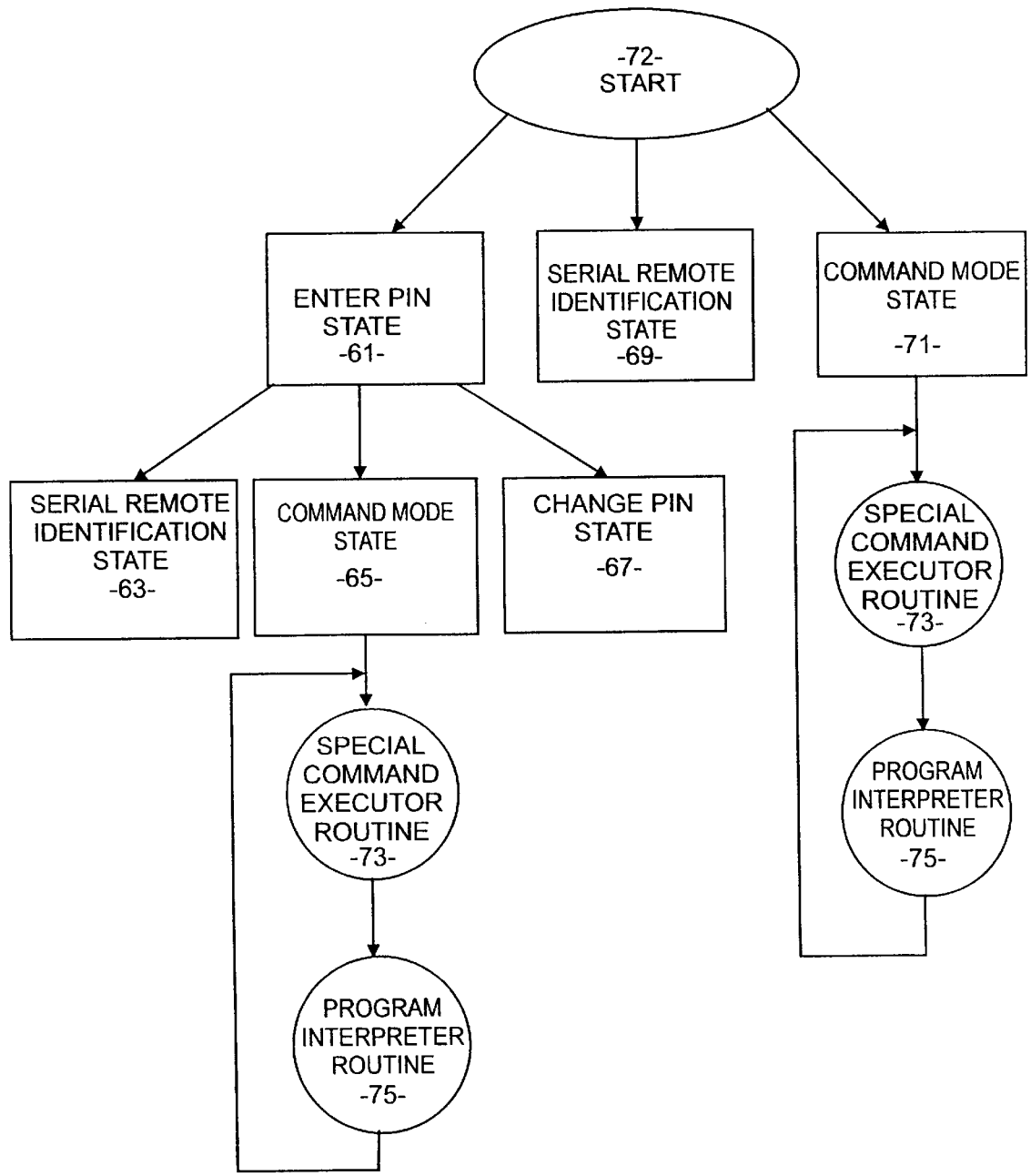
FIG. 3 is a flow chart showing the menu states of operation of the operating system program.
Figure 4:
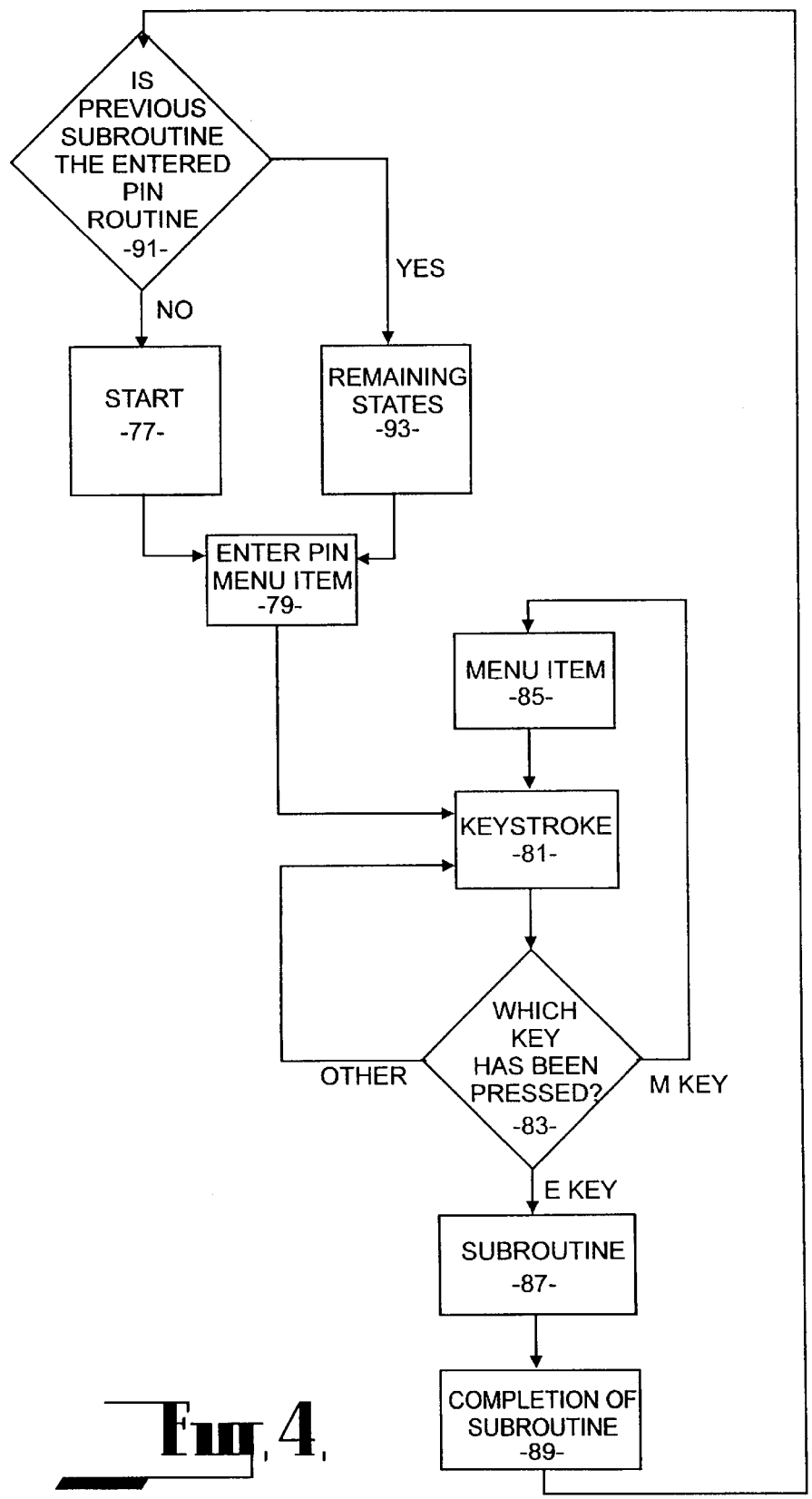
FIG. 4 is a flow chart showing the menu items routine of the operating system.
Figure 5:
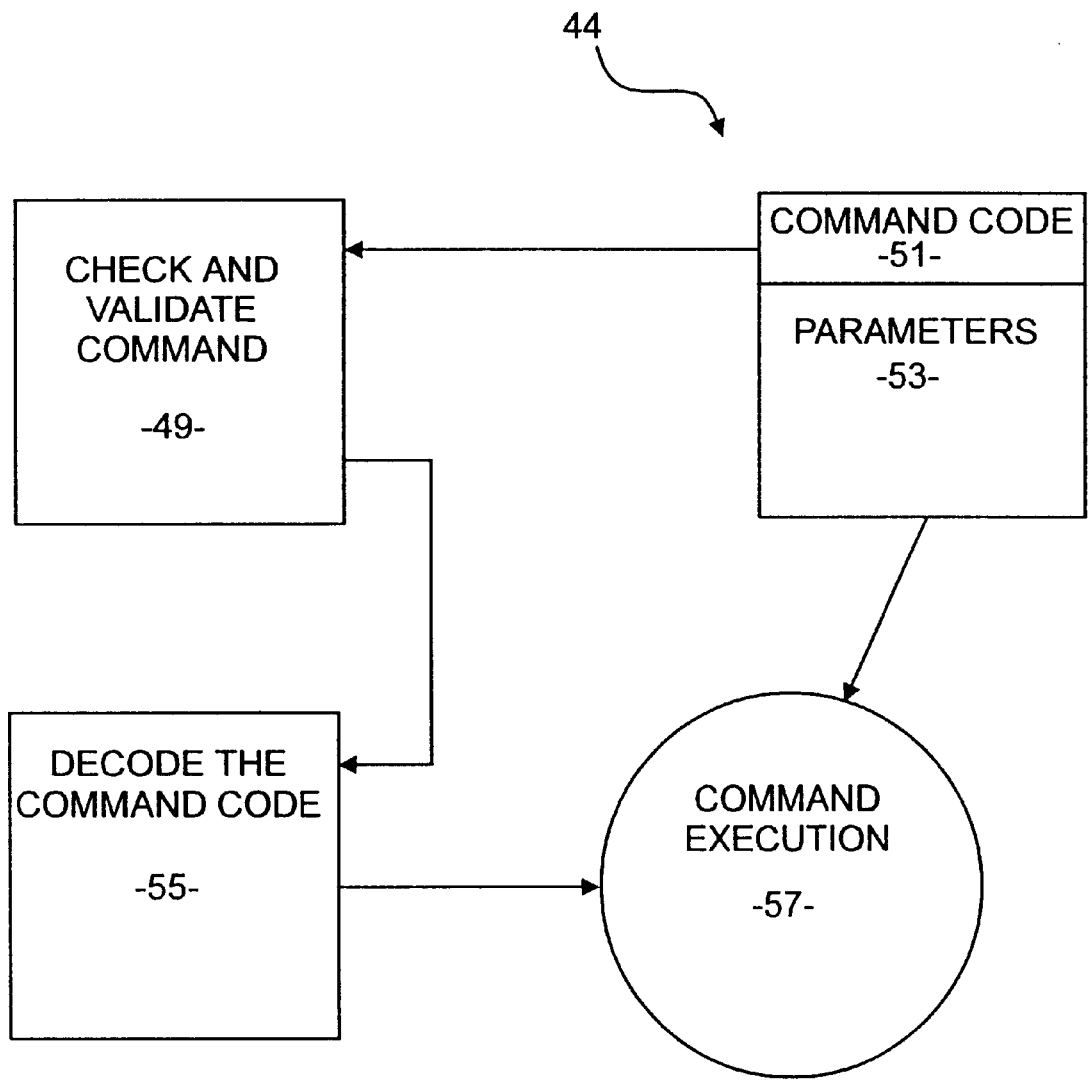
FIG. 5 is a block diagram showing the logical structures of the command executor.

As shown in FIG. 3 of the drawings, the operating system basically has six states of operation, each of which can be selected through the main menu routine as shown in FIG. 4 of the drawings. These states are basically divided into two groups, one requiring the use of a PIN and the other not. The states requiring the use of a PIN include an enter PIN state 61, a serial remote identification state 63, a command mode state 65 and a change PIN in state 67. The remaining group which does not require a PIN include a serial remote identification state 69 and a command mode state 71. Either group can be selected after the device is switched on as represented by a start block 72.

Upon entering a particular state, an appropriate subroutine is performed. In the case of the two command mode states 65 and 71, the special command executor and program interpreter routines 73 and 75 respectively are invoked, the program interpreter routine 75 being invoked in response to the command executor 73 receiving a prescribed command therefor, in a manner which will be described in more detail later.

The enter PIN state involves use of a standard routine for decoding a PIN entered into the device by a user. In the present embodiment, the choice of entering a PIN causes a different cipher key to be utilised for the purposes of using either the serial remote identification or command mode states. In this manner, different levels of security can be provided in relation to the functions performed by the device in the serial remote identification or command mode states, depending upon whether a password is used or not. Thus, depending upon the serial remote identification or command mode state invoked, the different data files and/or records thereof may or may not be accessed, dependent upon the access restrictions of the data file and record, enabling the device to be conveniently used for applications of a low security level as well as applications requiring a high level of security, depending upon the password access.

The accessing of these different states is demonstrated by the menu flow chart as shown in FIG. 4 of the drawings. Moreover, the initial state of operation of the main menu routine commences at block 77, whereby the three initial states 61, 69 and 71 are available for selection. The first state, enter PIN 61, is displayed as a menu item as shown at block 79, wherein after the routine proceeds to wait for a key stroke represented at block 81. A decision block 83 to determine which key is pressed follows, whereby if the M key is pressed, the routine reverts to displaying the next menu item represented at block 85 and waiting for the keystroke at block 81 once more. If the E key is pressed, representing that the displayed item is selected, the appropriate subroutine for this item is then run, as represented at block 87. If a key other than the M or E key is pressed, this is taken to be an invalid key press and the subroutine returns to waiting for another key stroke as represented by block 81.

At block 87, if the entered PIN key state is selected, the appropriate subroutine is performed, requiring the correct PIN to be entered. At the completion of this subroutine, as represented by block 89, the main menu routine proceeds with determining whether the previous subroutine is the entered PIN routine by a decision box 91, and if so, proceeds with making available the remaining states 63, 65 and 67, as represented at block 93. In the case that the subroutine run at block 87 is that associated with serial remote identification state 69 or command mode state 71, upon completion of the subroutine at block 89, the routine determines at box 91 whether either of the previous states followed entry of a PIN. If not, the routine returns to the initial menu block 77, and subsequent display of the first menu item at block 79.

The serial remote identification state is designed to provide remote identification of a user of the intelligent device, with or without direct connection of the device to an interface device of a service provider. In this respect, the identification state invokes an algorithm which corresponds with an algorithm stored in the host processing device. This algorithm involves a challenge/response mode involving a cryptographic process using a cipher key. As previously described, this cipher key is different, depending upon whether the serial remote identification state 63 or 69 is entered. These cipher keys match with corresponding cipher keys stored in the host processing device so that when a matching key is selected, a challenge code entered into the intelligent device and into the host processing device will result in the same identity code being generated by the cryptographic processing performed by the algorithm in each device. Consequently, the identity of the card user, or alternatively the service provider can be determined and affirmed by one or the other party issuing an appropriate challenge code and receiving a matching response.

Algorithms of this type are commonly known in the industry, and will not be further described herein.

With respect to the command mode state, the command executor routine is concerned with communications performed via the serial communications port 15 of the intelligent device. Commands to the device are processed and a response is returned or a status is returned to indicate whether the communication is complete or whether more data is required.

The operating system interacts with the command executor routine, but is discrete from it. This interaction comes into play when commands are received at the serial communication port 15 of the device.

The command executor routine 39 is of a form similar to that designed for most IC cards and visual IC cards. It is designed to have the CPU 27 wait for receipt of a command from the operating system level 37, perform a certain function or set of functions depending upon the command, and provide a result and/or status to the command for the operating system to proceed with processing, before resuming to wait for the next command. In this sense, the command executor 39 is used for operations such as creating data files 33 or setting access restrictions to the data files 33 and records 35 thereof at a level removed from the basic operating system level 37.

In the present embodiment, the list of commands used are as follows:
put to display
get from keyboard
present password
open data area (file)
read data
write data
change password
create data area (file)
load program module
execute program module
do encrypt
do decrypt These commands are relatively self explanatory except for load program module and execute program module which are relevant to the program interpreter routine which will now be described.

The program interpreter routine is concerned with a program module or list of instructions as received via a serial communications port 15.

The program interpreter routine 41 provides a level of operation separate from both the operating system 37 and command executor 39. The program interpreter 41 essentially is designed to execute selected program modules 43 which, in the present embodiment, are stored in the RAM 21. Instructions are fetched sequentially from the list of instructions appearing in the program module and are interpreted so that the CPU 27 performs the kind of action required of it.

The instruction set of the program interpreter comprise some 38 different instructions, brief details of which are summarised below.

| | |
|---|---|
| Get Key [n][t](p1) | get (n) key strokes terminated by key (t) into locations starting at (p1). (n) can be 1 to 16. (t) can be any key code or no key (zero) if terminating key not needed. |

-continued

| | |
|---|---|
| Put LCD (p1) (p2) | put char at location (p1) to the display at position (q). |
| Get LCD (p2) (p1) | get char from display position (p2) and store to location (p1). |
| Swap LCD | swap hidden & visible display lines (the display has 1 physical line and 2 logical lines). |
| Put comm (p1) | send char at location (p1) to serial port. |
| Get Comm (p1) | get char from serial port and store to location (f). |
| Set Rate [n] | set serial port data rate. (n) = 0 for 9600, 1 for 4800, 2 for 2400 and 3 for 1200 bps. (default is 9600). |
| Put Record (p1)[n][f] | put data starting from location (p1) and store in record (n) of file (f). |
| Get Record (p1)[n][f] | get data from record (n) of file (f) and store starting at location (p1). |
| Open [f] | open file (f) for access. |
| Close | close the open file (only one file at a time allowed open). |
| Create [f][n][s][a] | create file (f) with (n) records of size (s) with access rules (a). (if (r) = 0 then Add R must be used). |
| Add Rec [s][a] | add record to file under creation with record size (r) and access rules (a). (can only be used if (r) in Create is 0). |
| Pres PW [n](p1) | present data starting at location (p1) as password [n]. |
| Comp (p1) (p2) | compare data at locations (p1) and (p2) and set flags to indicate if = or = and < or >. |
| Branch X [n] | on flag condition X change program exection to run fron current location = (n). X can be EQ, NE, GT, LT & Au EQ is =, NE is =, GT is >, LT is < and AW is alway. |
| ST Loop [n] | execute following list of instructions (n) times. the list must be followed by a Loop Bk instruction. |
| loop Bk | used to signal the end of a block of instructions begun by a St Loop instructions. |
| Call [e] | a subroutine call, (e) is the entry point location |
| Ret | & return from subroutine call. |
| Add (p1) (p2) | add chars at locations (p1) and (p2), result is in (p1) and any carry sets a flat to indicate >. |
| Sub (p1) (p2) | subtract at location (p1) and (p2), result is in (p1) and any borrow sets a flat to indicate <. |
| Shf R (p1) | bit shift char at location (p1) "right" (MSB to LSB), the lsb is discarded and the msb is filled with a 0. |
| Shf L (p1) | bit shift char at location (p1) "left" (LSB to MSB), the msb is discarded and the lsb is filled with a 0. |
| AND (p1) (p2) | logical and chars at locations (p1) and (p2). |
| OR (p1) (p2) | logical or chars at location (p1) and (p2). |
| XOR (p1) (p2) | logical xor chars at locations (p1) and (p2). |
| BCD2Bin (p1)[L] | convert numeric data starting at location (p) from BCD to Binary. (L) is length of BCD data. |
| Bin2BCD (p1)[L] | convert numeric data starting at location (p1) from BCD. (L) is length of Binary data. |
| Bin2ASC (p1) | convert data a location (p1) from binary to ASC11 representation. (ASC11 Hex). |

-continued

| | |
|---|---|
| ASC2Bin (p1) | converts two chars starting a location (p1) from ASC11 Hex representation to Binary. |
| ENC (p1) (p2) | encrypt 8 bytes of data starting at location (p1). using DES cipher key starting at location (p2). |
| DEC (p1) (p2) | decrypt 8 bytes of data starting at location (p1) using DES cipher key starting at location (p2). |
| PUT data Px | put data following the instruction into either P1 or P2. |
| MOV (p1) (p2) | move data at location (p1) to (p2). |
| ICR Px | Increment either P1 or P2. |
| DCR Px | decrement either P1 or P2. |
| LDPRG | load another code module into the execution buffer. |

With respect to the above summary, the following should be noted:

1. all references to "locations" means memory locations.
2. parameters [a], [f], [L], [n], [s] & [t] are 8 bit values.
3. parameters [e] (p1) & (p2) are 12 or 16 bit values.
4. file Identifiers [f] range from 0 to 127.
5. branch "offset" values [n] range from −128 to 127, the MSB bit indicates positive or negative. (MSB=1=−Ve).
6. for operations involving (p1) and (p2) the result will be in (p1) except Comp where there is no result.
7. (p1) and (p2) are logical names for values that point to memory locations.
8. the St Loop instruction makes a copy of [n] for the Loop Bk instruction to decrement when it is encountered. While the copy of [n] is not zero Loop Bk will send program execution back to the instructions after St Loop [n]. Nesting of Loops is limited to 3 levels.
9. subroutine Nesting is not provided for, only 1 level is allowed.
10. the PUT, ICR & DCR instructions affect the value of the logical name and NOT the location they point to.
11. there are 16 passwords so [n] in Pres P is between 0 and 15.
12. if [s]=0 in Create, then MSB of File ID is set to indicate file has records of variable length, which allows each record to have its own access rules.
13. the Add Rec instruction must be used following a Create with [s]=0, to build the file structure. It has to be performed [n] times to complete the file structure. Once the Create with [s]=0 is launched the device enters a state where it requires the correct number of Add Rec's be performed even if the power is interrupted. All other file operations will be denied with a status to indicate the current situation.

The RAM 21 includes a communications buffer 44 within which discrete commands are stored along with their parameters, an execution buffer 45 of typically 64 to 128 bytes within which program modules 43 are stored, and a scratch pad 47 for general processing use by the subroutines.

Now describing the logical operation of the special routines and their relative interaction in more detail, firstly, the operating system core is designed to wait for a message from the serial communication port 15 of the device. When a message is received, the operating system core places it in the command buffer 44 and control is then passed to the command executor. The message is assumed to comprise the format command code followed by parameters related to the command code, as shown in FIG. 4 of the drawings.

The operation of the command executor 39 as represented by the logic block 49, causes the CPU 27 to look at the command code 51 in the buffer, checking it and validating it as being a real command. The parameters 53 following the command code and buffer are then checked and validated as being of correct length and data type for the particular command 51. Upon satisfactory checking and validation, as represented by logic block 55, the command code is decoded by using it as an index into a table of subroutine addresses, where the correct address is selected for subsequent execution of the command as represented by logic block 57.

Figure 6:
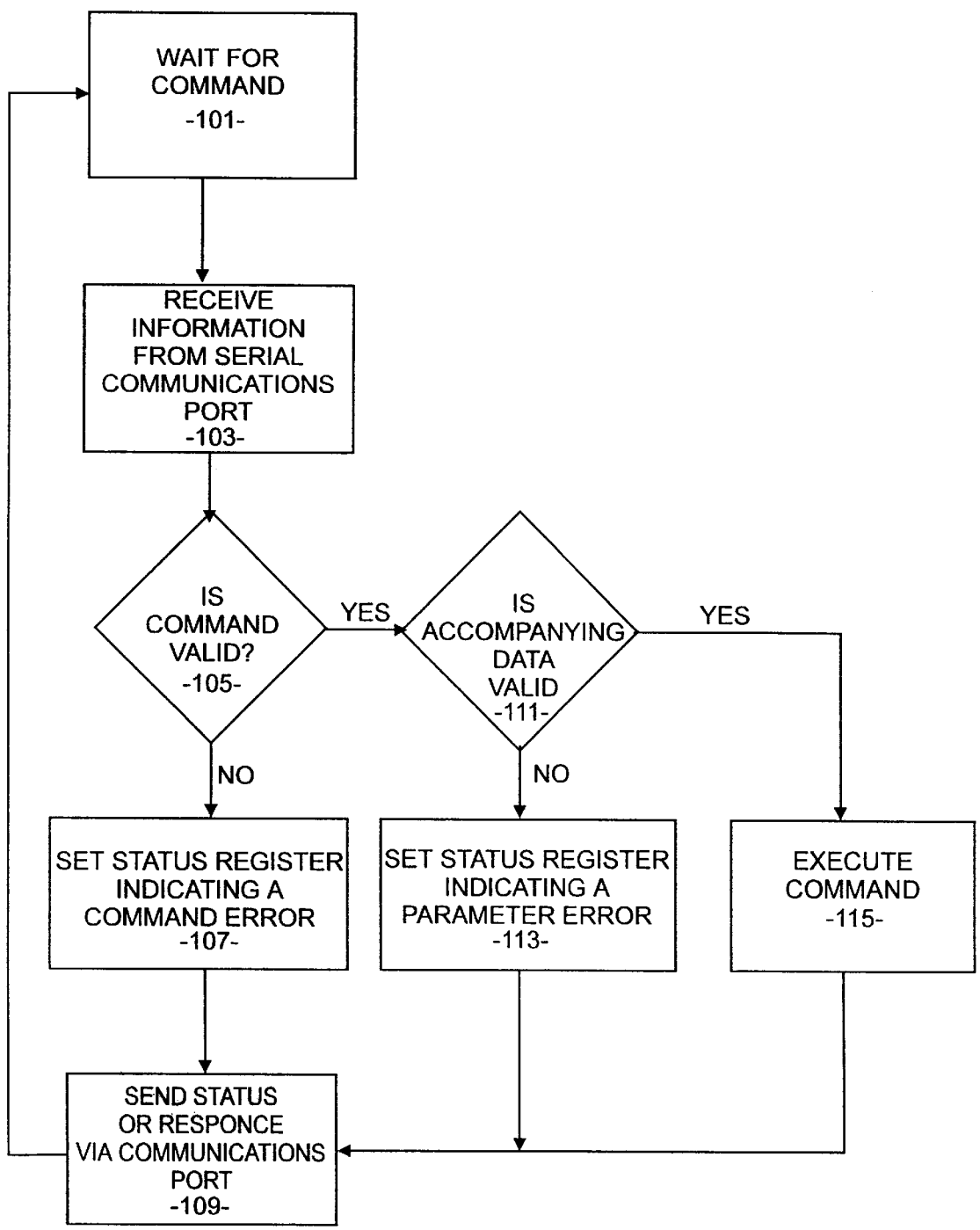
FIG. 6 is a flow chart showing the operation of the subroutine of the command executor.

The flow chart for the command executor subroutine is shown at FIG. 6 of the drawings and initially commences with waiting for a command as represented at block 101. Upon receiving information from the serial communications port 15, represented at block 103, the subroutine then proceeds to determine whether it is a valid command or not at decision box 105. If it is not a valid command, the subroutine proceeds by setting the status register of the microcomputer to indicate that there was a command error as represented at block 107 and then sends the appropriate status out through the communications port 15 as represented at block 109. At this point, it then returns to block 101 to wait for another command.

If the decision made at block 105 is that it is a valid command, the subroutine then proceeds to determine whether the data accompanying the command is valid or not as represented at block 111. If it is not valid, it sets the status register of the microcomputer to indicate that there was a parameter error as represented at block 113 and then proceeds with sending the status out through the communication serial port as represented at the block 109, before returning to wait for another command at block 101.

If the subroutine determines that the data is valid, at box 111, it proceeds with executing the command as represented at block 115 and then sending the response out through the serial communications port 15 as represented at block 109 before returning to block 101 in order to wait for the next command.

In the present embodiment, a program module 43 is sent to the intelligent device 13 when connected to an interface device 11 such as the POS terminal and is loaded into the execution buffer 45 by the command executor 39. These program modules 43 can be sent in encrypted form and are adapted to work with one or more data files 33 or records 35 thereof which are stored in the EEPROM 19.

An example of a program module is as follows:

1. Get 4 key strokes.
2. format data to 8 bytes.
3. encrypt using key number 3, stored in file 2.
4. merge result with key number 3 in file.
5. increment value of key number 3.
6. return merged result.

If necessary, a number of program modules 43 can be chained together to provide an extended capability of the system. Chaining is required due to the limited space inside the intelligent device available for storing program modules. Thus, the amount of processing that can be performed is limited, however program modules can be loaded in sequence to allow for extended processing.

These program modules 43 are application specific to the type of transaction that is to be established between the service provider and service user, as are the data files 33. Thus, a program module can be loaded into the intelligent device 13 from the interface device 11 via the coupler 14 and be executed automatically by the program interpreter 41, without the program flow being observed either by the service provider or the service user, and thus provide a high level of security for any sensitive data that the card may contain. This high level of security is provided as a result of the microcomputer operating in single chip mode. Thus, there are no 'instruction fetch' and 'data read or write' cycles occurring on the microcomputers pins. The microcomputer runs from internal memory, mask ROM, RAM or EEPROM. None of the program execution can be observed electrically, electronically or of course visually.

It should be appreciated that sophisticated equipment is available to observe program execution in micro-processor systems for test and debugging purposes which could be put to use for gathering information like passwords and access codes, however, it is not possible to use this equipment with a single chip microcomputer.

Although in the present embodiment program modules are stored in RAM, certain program modules specific to particular transactions are stored in nonvolatile memory in either a temporary or permanent capacity.

The execution of a loaded program module is not performed automatically by the program interpreter, but instead is performed only in response to a specific command executed by the command executor. When executed, the command executor 37 is designed to pass control of the CPU 27 over to the program interpreter 41.

The program interpreter 41 is designed so that when directed by the command executor 39 of the intelligent device to execute the list of instructions of the program module 43, it automatically fetches each instruction from the execution buffer 45, decodes it and acts upon it. The list of instructions may include conditional instructions which can change the flow of execution, and hence the list of instructions of the program module 43, need not necessarily be executed in a linear sequence.

Figure 7:
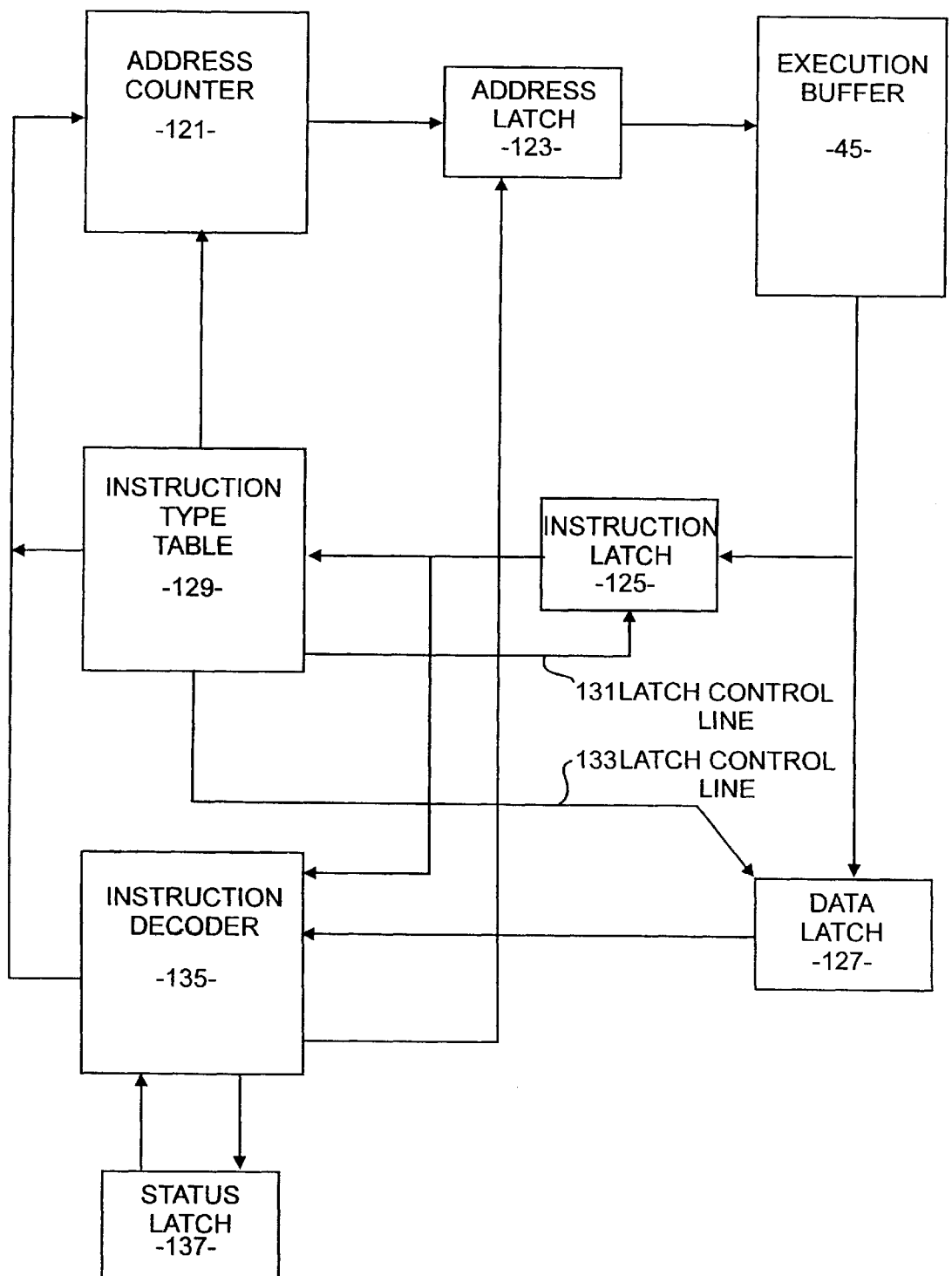
FIG. 7 is a block diagram showing the logical structures of the program interpreter.

The logical structure of the program interpreter is shown in FIG. 7 of the accompanying drawings. As shown, the instruction codes and data are stored in the execution buffer 45 for fetching and decoding by the program interpreter. In this respect, the program interpreter comprises an address counter 121 and address latch 123 for addressing the appropriate memory byte of the execution buffer in which the instruction or data being fetched is stored. The addressed byte of the execution buffer 45 is loaded either into an instruction latch 125 or a data latch 127, depending upon whether the byte is deemed to contain an instruction or data.

In this respect, the program interpreter is designed to assume that the first byte of the program module stored in the execution buffer 45 is an instruction code. This instruction code would then be stored in the instruction latch whereby an instruction type table 129 firstly decodes the instruction to determine if more addresses are needed to be generated by the address counter 121 and address latch 123 for latching data stored into the data latch 127. Dependent upon the recognition of the instruction by the type table 129, the instruction latch 125 or data latch 127 is controlled as indicated by the latch control lines 131 and 133. An instruction decoder 135 is then operated to look up a table of subroutine addresses using the instruction code stored in the instruction latch 125 as an index. The relevant subroutine is then executed and when finished, the instruction type table increments the address counter 121 to access the next instruction of the program module stored within the execution buffer 45.

Instructions will be fetched from the buffer in sequence until the result of an instruction causes the address counter to be reloaded with a different value, which changes the path of the instruction flow. Instructions are automatically fetched until the end of the buffer is encountered or an end instruction is found. In both cases, control will revert to the command executor, whereby the end instruction will cause the command executor to resume waiting for another input communication on the serial communication port 15, whereas the end of buffer instruction would cause the command executor to get more data for the execution buffer and then pass control back again to the interpreter.

It should be noted that the address counter 121 presents sequential addresses to the execution buffer 45 via the address latch 123, whereby it is normally incremented by the instruction type table 129. The address counter 121 however, can be reloaded by either the type table 129 or the decoder 135 and the address latch 123 can be written to by the decoder 135 directly.

The instruction decoder 135 sets in motion the operations for a code, such as reading or writing or performing a test or making a decision, and continuously updates the status latch 137 to indicate its status at any particular point in time.

Figure 8:
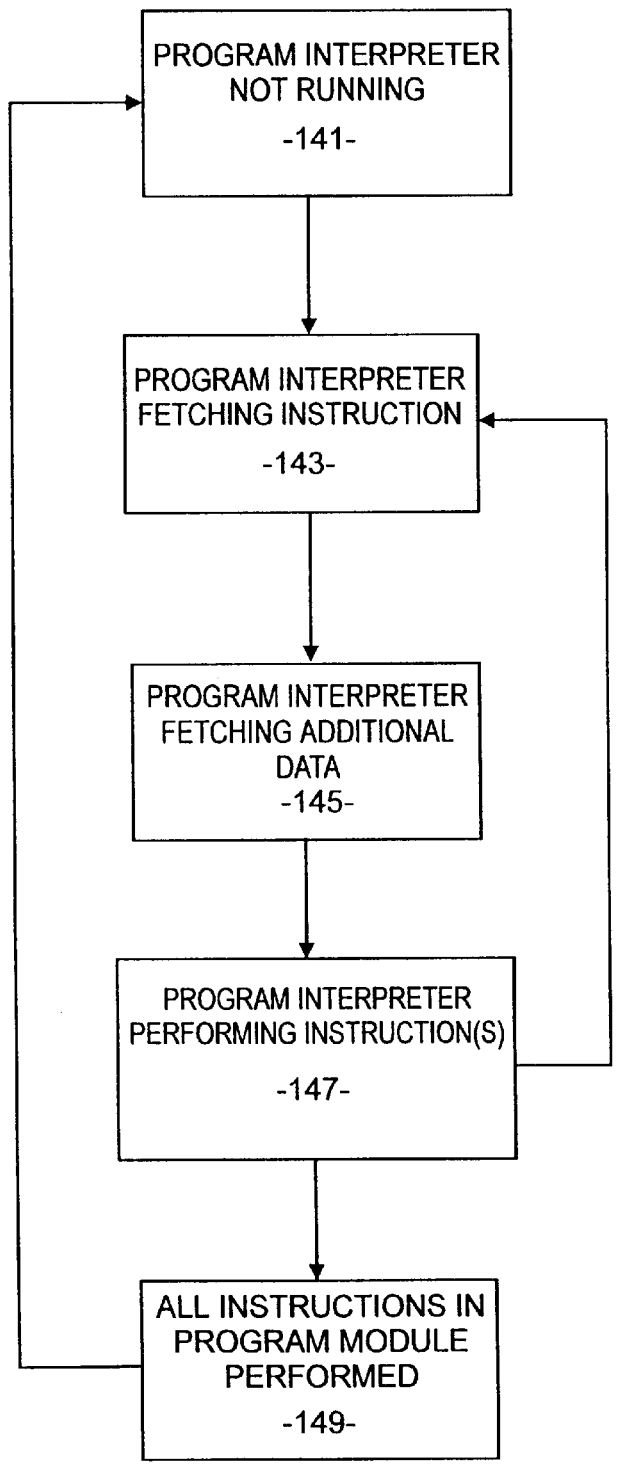
FIG. 8 is a flow chart showing the states of operation of the program interpreter.

The states of the operation of the program interpreter 41 are shown in FIG. 8 of the drawings, whereby the program interpreter is either not running, as shown in block 141, is fetching an instruction as represented by block 143, fetching additional data as required as represented by block 145, performing an instruction or instructions as represented by block 147, whereby it will cycle back to fetching an instruction at block 143 until all of the instructions contained within the program module are performed, as represented by block 149. Upon completing execution of the program module, the program interpreter will return to the not running state of block 141.

Figure 9:
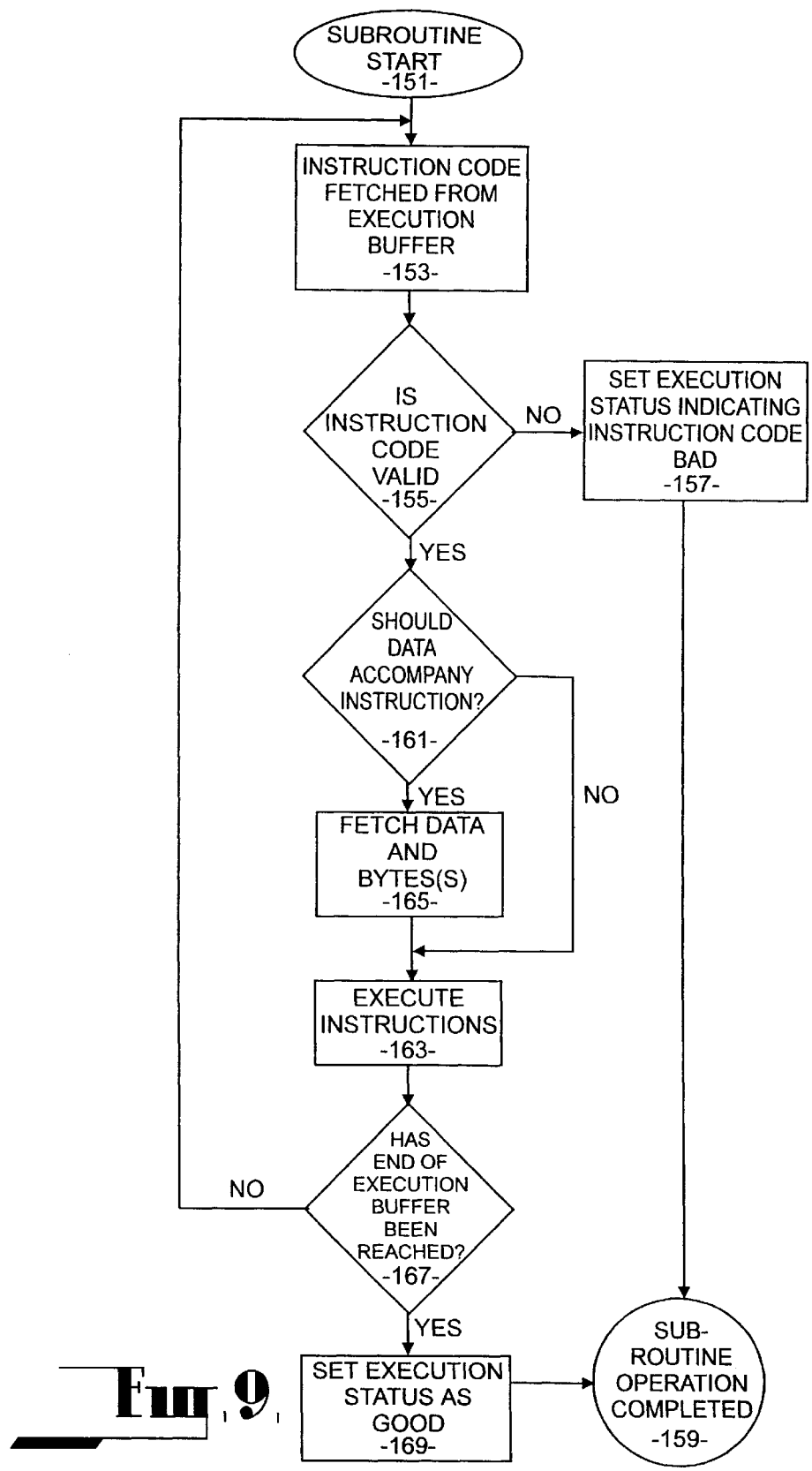
FIG. 9 is a flow chart showing the operation of the subroutine of the program interpreter.

The actual flow chart representing the operation of the program interpreter of the subroutine is shown at FIG. 9 of the drawings. After start of the subroutine represented at block 151, the first instruction code from the execution buffer is fetched, as represented at block 153. The subroutine then determines whether it is a valid instruction code as represented at decision box 155 and if not sets the execution status of the microcomputer to indicate that the instruction code was bad, as represented at block 157 whereupon operation of the subroutine is completed at shown at block 159 and control is returned to the command executor. If the instruction code is determined to be valid, the subroutine then determines whether there is any data that should be accompanying the instruction as represented at decision box 161. If not, it proceeds directly with executing the instructions represented at block 163, but if there is, it proceeds with fetching this data from the buffer and the byte or bytes immediately following the address of the current instruction as represented by block 165 and then proceeding to execute the instruction represented at block 163. Upon completing the execution of the instruction, the subroutine then determines whether it is at the end of the execution buffer represented at decision box 167, and if not, proceeds with fetching the next instruction code from the execution buffer as represented by block 153. If it determines that it is at the end of the execution buffer, the subroutine proceeds with setting the execution status as good as represented by block 169 and then ends the subroutine as indicated at block 159, returning control to the command executor.

It should be noted that the program interpreter actually takes a list of binary codes and uses them either as instructions to be executed, data to be worked with, addresses to get data from, decisions to be made, changes in execution path etc, as represented by the instructions set. Each eight bit byte will represent an instruction or a piece of data or part of an address location or an offset address. Importantly, under this system, the program module 43 is written using instructions that will be interpreted and acted upon by the program interpreter 41, and which importantly do not contain any of the native code of the CPU 27, which otherwise could possibly create a breach of security. Thus, any program module 43 is forced to do only what the program interpreter 41 allows it to do. The reason for this is that the native code of the microcomputer can do anything it likes, whereas the interpreter is structured so as to limit operation on, and access to data, and display of it, in a manner which can not cause a breach of security. This is achieved by way of the specific instruction set previously described, and by the interpreter not seeing memory as a single location, but rather as registers that are logically mapped from memory and as file storage areas, in the same way as the command executor would see memory.

It should be appreciated that native code could be used to easily read data from a file containing cipher keys, because to the native code, the file would be just another set of locations in memory. On the other hand, the program interpreter would see that the file containing those keys was a write only file and so could not read them, but only use the address of the key in the file as input to an encryption routine as opposed to the key itself.

Thus, although a program could be written in native code that could read and send out secure information such as cipher keys, the intelligent device of the present embodiment has no way of executing this native code except from its mask ROM and so it is not possible for such a program to be run from an external source in the intelligent device.

It can be seen that the instruction set for the program interpreter 41 of the present embodiment includes instructions especially for encryption and key management along with those for data storage, manipulation and testing, the latter being limited in their operation by access restrictions provided by the data files 33 and records 35 thereof.

Now describing the operation of the system for performing transactions whilst the IC card 13 is connected to an interface device 11, firstly with respect to data storage and manipulation, data files 33 are created initially and progressively having a plurality of records which record data and information relevant to a particular transaction to be performed between a service provider and a service user. Security is provided by the ability to place restrictions on file access and creation, whereby it is possible to configure the requirement for PIN number or challenge code, or both, to allow reading or writing or creating of file. Different levels of restrictions can be placed on individual files and their records. For instance a file can be configured as write only with access via the challenge code only, or read only with access being available only via the PIN and challenge code sequence.

A practical example of this is where a file having access restrictions may contain data pertaining to a postal address for forwarding the card, if lost. This file would have its file header encoded to allow free access to it. Other files, however, containing the name, address and phone number of the user could be at different levels of access to allow perhaps only the name and address but not the telephone number to be accessed. These files or records would have their headers appropriately encoded with access restrictions to allow different levels of access.

Separate file storage areas within the EEPROM 19 can be created to allow the IC card 13 to be used in a secure manner for a number of different applications. This partitioning of the EEPROM 19 is done using a 'file' directory or the address of the next file in the header of the previous file, ensuring that each application can access only the relevant files 33.

For example, the following list of applications could all possibly be operated within the one IC card:
Banking transactions and EFTPOS
Bill payment
Drug prescriptions
Health benefit refunding
Medical history summary
Club memberships
Ticketing systems
Bonus point systems
Car maintenance history, etc As previously described, the individual records 35 of a file 33 can have access restrictions separate of the entire file itself, which enables the saving of memory space. For example, with reference to the aforementioned example describing storing data for the postal address, name, residential address and phone number, in existing IC cards these would normally be stored in separate files in order to allow them to have different access restrictions. However in the visual IC card of the present invention, these could all be merged into the one file and be treated as separate records within that file, whereby the separate records have the different access restrictions so as to preserve the security of the system but save memory space by reducing the number of files.

The performance of a transaction revolves around the use of program modules 43 which have previously been programmed for the purposes of the service provider and the service use, and which permanently reside within the memory associated with the interface device. These program modules 43 are downloaded to the IC card for governing the particular transaction which is to take place after the transaction has initially been established as previously described.

In the present embodiment, the program modules 43 are stored in the coupler 14 as encrypted data, and after transfer to the RAM 21 of the card via the I/O port 15, are decrypted using the relevant algorithm of the cryptographic processing system for subsequent interpretation by the program interpreter routine 41. In other embodiments, the whole transaction process can be run from a remote host with program modules 43 being sent down the line as required, removing the need for them to be stored in the coupler.

After the operation of the program module has been completed, the operating system automatically erases it from the RAM 21, preventing subsequent unauthorised use of it and thus satisfying the security requirements of the service provider. Importantly, the automatic operation of the program interpreter and erasure of the program module(s) by the operating system cannot be overridden by either the service provider or service user once the transaction is established and performed due to the single chip embodiment of the microcomputer in the intelligent device, and the subsequent states of operation of microcomputer in the command mode state. Moreover, the microcomputer is either:

1. waiting for a menu item selection.
2. waiting for a command.
3. executing a command.
4. interpreting a program module.

When interpreting a program module, the program flow can not be diverted, the program interpreter running the program to completion or until an error occurs or until an abort command is issued.

An important advantage in adopting the present invention is that program modules can be changed when updates or enhancements are required at the service provider end, without requiring the IC card itself to be updated or enhanced. In addition, the entire transaction is regulated by the program module, minimising the likelihood of error and facilitating the performance of the transaction. Furthermore each "application" that the IC card supports can have a different type of data representation method tailored to suit the needs of the specific application. In this regard, data representation is not limited to the ASCII standard which is wasteful of storage space in limited situations such as IC card use, and hence by using application specific data representations, this problem can be alleviated. In addition, different security schemes may be implemented by different "applications" for example key management etc.

The method of operation and the advantages of using the described system for establishing and performing a transaction may be better understood by reference to the following example of a multiple application use of the IC card with a number of service providers. In this example, the IC card is prescribed for use in performing a transaction in the medical field, whereby separate data files are created, one containing a medical history summary of the user, another containing drug prescription information and another containing financial transaction information.

(1) A person goes to a doctor, for instance one who is not normally seen by them, equipped with the visual IC card. After performing the initial identification routine with the card, the doctor may be able to connect the card to his interface device which transfers a prescribed program module to the card. This program module subsequently allows the doctor to view the summary of recent medical history. From this, the doctor can make a diagnosis and prescribe drugs based on information from the patient and the summary stored within the card. The doctor can then document his diagnosis, drug prescription and consultation charge and transfer the same via the interface device for subsequent recording within the relevant data files provided on the card. This is all controlled via the program module resident within the card so that this information is conveyed from the interface device to the card and is subsequently automatically processed by the program interpreter. Upon completion of the operation of the program module or modules, the program modules are entirely erased from the card.

(2) The person can then go to a drug dispensary and again present the IC card to constitute the prescription. In this respect, the user again goes through the identification routine and connects the card to the interface device of the dispensary. Via the transfer and interpretation of a program module, in a similar manner as described in relation to the doctor, the dispensary can read the relevant drug prescription information and issue the relevant drugs prescribed for the person. Facilities provided for the dispensary to record the number of repeat prescriptions and the cost entered by the dispensary are entered via the control of the program module into the card.

(3) The person finally goes to their health insurance agency to claim a refund for the doctor's consultation charge and the cost of the drugs, whereby a similar identification and data interchange procedure ensues.

The important advantages provided by using the visual IC card and the scenario are, firstly with respect to the doctor, that a medical history summary enables the doctor to make better decisions for the prescription of medication to ensure that it does not conflict with another already being taken or with some other condition that the patient may have; with respect to the drug dispensary, the visual IC card positively identifies the patient and the doctor, thereby protecting against fraudulent prescriptions, and additionally enables for the drug and dosage to be clearly identified, protecting against the wrong drug being issued and wrong dosage instructions; and thirdly, recording the consultation charge and the cost of the drugs in the visual IC card, provides a convenient and possibly more secure way of providing payment and obtaining a refund from the health insurance company.

In this respect, the financial transaction data file may be linked with a particular financial institution, whereby the institution may enter an available credit to the user upon purchase of the same, from which the consultation charge and drug charges are debited by the respective doctor and dispensary and which are subsequently credited in part or full by the health insurance company.

In this scenario, due to privacy and security requirements, different data files will have different access restriction requirements such as follows:

| Medical | Current History | Health Prescription | Costs |
| --- | --- | --- | --- |
| Doctor | Read and add | Read and add | Add only |
| Dispensary | No access | Read and Modify | Add only |
| Health Insurance | No access | No access | Read and Modify |

The add access restriction is to ensure that the doctor can only add to the medical history, prescription or health cost files and not change any of the existing records.

The modified access restriction is to ensure the dispensary can only reduce the number of repeats on a particular prescription when issued or the health insurance company can only mark as refund paid for a particular cost.

As can be seen from the example, the support of multiple applications within the visual IC card provides for requirements of data representation, procedural operation, privacy and security that are different and specific to each application. By having the IC card execute program modules that are loaded into it from the coupler, a system is devised that can easily take care of the requirements of multiple applications in the one card, with a high degree of flexibility and security, and without the need for customized programming of the coupler.

It should be appreciated that the scope of the present invention is not limited to the particular embodiment described.

We claim:

1. A system for performing a transaction comprising:
   (i) a self contained portable intelligent device including a microcomputer having an input/output communication port, nonvolatile memory and random access memory; and
   (ii) an interface device associated with a memory for storing data and a coupler to effect communication with said intelligent device for establishing communications therewith;
   said nonvolatile memory being arranged such that one part thereof has an operating system which can be run for performing basic functions of the device, said operating system being programmed in the native code of said microcomputer;
   said random access memory being provided for use by said microcomputer when performing a function under the control of the operating system and for storing data received from or ready for transmission via said communication port; and said interface device including one or more program modules stored within said memory, a said program module comprising one or more instructions forming part of a prescribed instruction set discrete from said native code;

wherein said store includes a program interpreter for interpreting and executing a said program module when the microcomputer is under the control of said operating system to perform a transaction in accordance with said instruction(s) of said prescribed instruction set comprising said program module.

2. A system as claimed in claim 1, wherein said nonvolatile memory also includes a command executor for receiving a command, performing a prescribed function in respect of said command, and providing a result or status to the command, when the microcomputer is under the control of said operating system.

3. A system as claimed in claim 1, wherein said nonvolatile memory is arranged such that a second part thereof is adapted to store data files having different access restriction levels thereto; and said program module is programmed with one or more said instructions from said prescribed instruction set, particularly adapted to enable working with prescribed data files within said second part of said nonvolatile memory when said microcomputer is under the control of said program interpreter and interpreting and executing said one or more instructions;

and wherein said one or more instructions have restricted control functions to limit access to said data files.

4. A system as claimed in claim 1, wherein said program module is programmed with one or more said instructions from said prescribed instruction set, particularly adapted to enable the performing of control functions solely in accordance with said prescribed instruction set and peripherals of the device.

5. A system as claimed in claim 2, wherein said program module is loaded into said random access memory via said communication port when said microcomputer is operating said command executor in response to a prescribed command received and executed thereby for subsequent execution by said program interpreter.

6. A system as claimed in claim 2, wherein said program module is loaded into a third part of said nonvolatile memory via said communication port when said microcomputer is operating said command executor in response to a prescribed command received and executed thereby for execution by said program interpreter.

7. A system as claimed in claim 1, wherein said program module is encrypted and said nonvolatile memory includes a data encryption and decryption program for execution by said microcomputer to decrypt said program module in accordance with a prescribed algorithm.

8. A system as claimed in claim 7, wherein said prescribed algorithm is the Data Encryption Standard algorithm (D.E.S.) or RSA algorithm.

9. A system as claimed in claim 1, wherein said intelligent device includes a keyboard and display.

10. A system as claimed in claim 1, wherein a plurality of said program modules are loaded sequentially into said random access memory and chained together to extend the capability of the system.

11. A system as claimed in claim 10, wherein said program modules are encrypted and said nonvolatile memory includes a data encryption and decryption program for execution by said microcomputer to decrypt said program modules in block chaining mode in accordance with a prescribed algorithm.

12. A system as claimed in claim 3, wherein said data files each comprise records whereby different records within a file can have different access restriction levels thereto.

13. A system as claimed in claim 12, wherein said data files and records each comprise headers for specifying an access restriction level.

14. A system as claimed in claim 13, wherein said access restriction level comprises a password.

15. A system as claimed in claim 1, wherein a said program module is adapted to allow a data representation method suited to the specific application thereof to be used.

16. A system as claimed in claim 2, wherein operation of said program interpreter is invoked when said microcomputer is operating said command executor in response to a prescribed command received and executed thereby.

17. A system as claimed in claim 1, wherein said microcomputer is a single chip microcomputer.

18. A system as claimed in claim 1, wherein said operating system is mask programmed in said native code.

19. A self-contained portable intelligent device for performing a transaction with an interface device associated with a memory for storing data and a coupler for connecting to said intelligent device for establishing communications therewith, the intelligent device comprising:

a microcomputer having an input/output communication port, nonvolatile memory and random access memory; wherein:
(i) said nonvolatile memory is arranged such that one part thereof has an operating system which can be run for performing basic functions of the device, said operating system being programmed in native code of said microcomputer;
(ii) said random access memory is provided for use by said microcomputer when performing a function under the control of the operating system and for storing data received from or ready for transmission via said communication port;
(iii) said nonvolatile memory includes a program interpreter for interpreting and executing a program module transmitted thereto for performing a transaction; and
(iv) said program module comprises one or more instructions forming part of a prescribed instruction set discrete from said native code.

20. An intelligent device as claimed in claim 19, wherein said nonvolatile memory includes a command executor for receiving a command, performing a prescribed function in respect of said command, and providing a result or status to the command, when the microcomputer is under the control of said operating system.

21. An intelligent device as claimed in claim 20, wherein said nonvolatile memory is arranged such that a second part thereof is adapted to store data files having different access restriction levels thereto;

said program module is programmed with one or more said instructions from said prescribed instructions set, particularly adapted to enable working with prescribed data files within said second part of said store when said microcomputer is under the control of said program interpreter and interpreting and executing said one or more instructions; and wherein said one or more instructions have restricted control functions to limit access to said data files.

22. An intelligent device as claimed in claim 19, wherein said program module is programmed with one or more said instructions from said prescribed instruction set, particularly adapted to enable the performing of control functions solely in accordance with said prescribed instruction set and peripherals of the device.

23. An intelligent device as claimed in claim 20, wherein said program module is loaded into said random access memory via the coupler of the interface device and said communication port for execution by said program interpreter.

24. An intelligent device as claimed in claim 19, wherein said program module is loaded into a third part of said nonvolatile memory via the coupler of the interface device and said communication port for execution by said program interpreter.

25. An intelligent device as claimed in claim 19, wherein said program module is encrypted and said store includes a data encryption and decryption program for execution by said microcomputer to decrypt said program module in accordance with a prescribed algorithm.

26. An intelligent device as claimed in claim 19, wherein a plurality of said program modules are loaded sequentially into said random access memory and chained together to extend the capability of the system.

27. An intelligent device as claimed in claim 19, wherein said program modules are encrypted and said nonvolatile memory includes a data encryption and decryption program for execution by said microcomputer to decrypt said program modules in block chaining mode in accordance with a prescribed algorithm.

28. An intelligent device as claimed in claim 21, wherein said data files each comprise records whereby different records within a file can have different access restriction levels thereto.

29. An intelligent device as claimed in claim 28, wherein said data files and records each comprise headers for specifying an access restriction level.

30. An intelligent device as claimed in claim 29, wherein said access restriction level comprises a password.

31. An intelligent device as claimed in claim 19, wherein a said program module is adapted to allow a data representation method suited to the specific application thereof to be used.

32. An intelligent device as claimed in claim 20, wherein operation of said program interpreter is invoked when said microcomputer is operating said command executor in response to a prescribed command received and executed thereby.

33. An intelligent device as claimed in claim 19, wherein said microcomputer is a single chip microcomputer.

34. An intelligent device as claimed in claim 19, wherein said operating system is mask programmed in said native code.

35. A method for performing a transaction between a self-contained portable intelligent device as claimed in claim 19 and the interface device referred to therein, comprising:

creating a program module comprising one or more instructions forming part of a prescribed instruction set discrete from the native code for the microcomputer of the intelligent device;

storing said program module in the memory of the interface device;

coupling the intelligent device to the interface device for establishing communications therewith; and invoking a program interpreter included in the store of the intelligent device to interpret and execute said instructions of said program module.

36. A method as claimed in claim 35, wherein one or more said instructions are for working with prescribed data files within the intelligent device and have restricted control functions to limit access to said data files.

37. A method as claimed in claim 35, wherein said one or more instructions are for performing control functions solely in accordance with said prescribed instruction set and peripherals of the device.

38. A method as claimed in claim 35, including loading said program module into the memory of the intelligent device before invoking said program interpreter.

39. A method as claimed in claim 38 wherein said loading comprises invoking a command executor also included in the store of the intelligent device to receive and execute a load command from the interface device, and wherein said invoking of said program interpreter is performed by said microcomputer when operating said command executor pursuant to receiving and executing a program module execution command from the interface device.

40. A method as claimed in claim 35, wherein said data files have headers providing for different access restriction levels applicable to different program modules and wherein said instructions decode the header of a said prescribed data file before accessing it to determine whether it is accessible.

* * * * *